United States Patent
Mecca et al.

(10) Patent No.: US 11,246,391 B2
(45) Date of Patent: Feb. 15, 2022

(54) CONTAINER FOR STORING AND DISPENSING LOOSE POWDER IN A CLEAN AND EFFICIENT MANNER

(71) Applicant: Jerhel Plastics, Inc, Bayonne, NJ (US)

(72) Inventors: Leonard Mecca, Ridgefield, NJ (US); Joseph Orloski, Dalton, PA (US)

(73) Assignee: Jerhel Plastics, Inc, Bayonne, NJ (US)

( * ) Notice: Subject to any disclaimer, the term of this patent is extended or adjusted under 35 U.S.C. 154(b) by 630 days.

(21) Appl. No.: 15/887,118

(22) Filed: Feb. 2, 2018

(65) Prior Publication Data

US 2019/0037999 A1     Feb. 7, 2019

Related U.S. Application Data

(60) Provisional application No. 62/540,944, filed on Aug. 3, 2017.

(51) Int. Cl.
| | | |
|---|---|---|
| *A45D 33/02* | (2006.01) | |
| *B65D 83/06* | (2006.01) | |
| *B65D 41/04* | (2006.01) | |
| *G01F 11/26* | (2006.01) | |
| *B65D 25/04* | (2006.01) | |
| *A45D 33/00* | (2006.01) | |
| *B65D 1/10* | (2006.01) | |

(52) U.S. Cl.
CPC ........... *A45D 33/02* (2013.01); *A45D 33/003* (2013.01); *B65D 25/04* (2013.01); *B65D 41/04* (2013.01); *B65D 83/06* (2013.01); *G01F 11/261* (2013.01); *A45D 2200/05* (2013.01); *B65D 1/10* (2013.01)

(58) Field of Classification Search
CPC .. A45D 33/003; A45D 33/006; A45D 33/008; A45D 33/02; A45D 33/025; A45D 33/34; A45D 40/0075; A45D 40/0068; A45D 2040/0093; A45D 34/048
USPC ............... 132/307, 306, 305, 298, 297, 293; 401/130, 123; 215/382; 206/581, 823; 222/563, 568, 567
See application file for complete search history.

(56) References Cited

U.S. PATENT DOCUMENTS

| | | | | |
|---|---|---|---|---|
| 1,903,357 A | * | 4/1933 | Friedman ............... | A45D 33/06 132/298 |
| 6,053,183 A | * | 4/2000 | Rizzo .................... | A45D 33/006 132/307 |
| 2007/0110500 A1 | * | 5/2007 | Cochran .............. | A45D 34/046 401/122 |
| 2007/0257069 A1 | * | 11/2007 | Gibson ................ | B65D 47/123 222/563 |
| 2009/0188517 A1 | * | 7/2009 | Thorpe ................ | A45D 33/003 132/307 |

(Continued)

*Primary Examiner* — Tatiana L Nobrega
*Assistant Examiner* — Sarah Woodhouse

(57) ABSTRACT

A container for storing and dispensing loose powder has a jar, a multitiered sifting-dispenser, a dispenser slot, and a closure plug. The multitiered sifting dispenser is a rigid frustum-shaped divider that separates an interior cavity of the jar into two compartments. The dispenser slot traverses from a first compartment to a second compartment by passing through the multitiered sifting-dispenser. As a result, cosmetic powder that is stored in the first compartment can be dispensed into the second compartment and subsequently deposited onto the multitiered sifting dispenser. The closure plug serves to plug the dispenser slot. To accomplish this, the closure plug is held into place by the jar lid.

3 Claims, 7 Drawing Sheets

(56) References Cited

U.S. PATENT DOCUMENTS

2012/0090637 A1* 4/2012 Holloway ............. A45D 33/02
132/299
2013/0008822 A1* 1/2013 Hefetz .................. A45D 33/02
206/524.1

* cited by examiner

CONTAINER FOR STORING AND DISPENSING LOOSE POWDER IN A CLEAN AND EFFICIENT MANNER

The current application claims a priority to the U.S. Provisional Patent application Ser. No. 62/540,944 filed on Aug. 3, 2017.

FIELD OF THE INVENTION

The present invention relates generally to a jar for cosmetic powder. More specifically, the present invention relates to a multitiered jar for dispensing and assisting in the clean and efficient application of cosmetic type loose powders.

BACKGROUND OF THE INVENTION

The dispensing and applying of cosmetic type loose powders can at times be difficult or messy. Traditional cosmetic powder jars simply store a quantity of cosmetic powder within an interior cavity. This enables a user to access the stored cosmetic powder, albeit in a messy and inelegant manner. Because traditional cosmetic powder jars do not feature a component for removing excess powder, the user is often forced to employ suboptimal techniques for gathering and applying an appropriate amount of cosmetic powder. For example, the user must pour the loose powder from the jar into the lid A brush is then used to swirl the powder in the lid to transfer powder to the brush. The only way to remove the excess powder from the brush is to tap the brush against the lid side walls. When done, the consumer then attempts to pour the excess powder, that is in the lid, back into the jar. The swirling, tapping, and pouring are all very messy. Additionally, there steps often lead to the powder falling outside of the jar and lid.

The present invention, the container for storing and dispensing loose powder in a clean and efficient manner, addresses the above-described shortcomings of traditional cosmetic powder jars by providing a jar with integrated powder retention steps, an area within the jar to transfer powder to the brush, and a means for the excess powder to be removed from the brush and deposited back into the jar. All of this is accomplished in an elegant clean fashion. The loose powder stays where it belongs i.e. in the jar and on the applicator brush. The present invention enables the user to dispense only a desired quantity of cosmetic powder. Additionally, the powder retention steps of the present invention provide a textured surface that can be used to remove any excess cosmetic powder from the cosmetic applicator without the applicator coming into contact with the remaining quantity of cosmetic powder stored within the jar. To increase ease of use, the present includes a slot within the dispensing area and a stepped textured area that are used to apply cosmetic powder to a user's brush while removing any excess cosmetic powder from the user's brush. This enables the user to finely tune the amount of cosmetic powder that will be gathered by the cosmetic applicator/brush.

DETAIL DESCRIPTIONS OF THE INVENTION

All illustrations of the drawings are for the purpose of describing selected versions of the present invention and are not intended to limit the scope of the present invention.

As can be seen in FIG. 1 through FIG. 7, the preferred embodiment of the present invention, the container for storing and dispensing loose powder in a clean and efficient manner, is a multicompartment jar that enables a user to dole out desired quantities of a cosmetic powder. Specifically, the present invention is a jar with two internal compartments that are separated by a sifting dispenser. A first compartment is integrated into the base of the jar and is used to store a powdered cosmetic. The remaining, second, compartment can be accessed by the user and is used to dispense the cosmetic powder. To transfer a portion of the cosmetic powder from the first compartment into the second compartment, the user first removes a closure plug from a dispensing slot, then the user replaces the lid and upends the jar so that a portion of the cosmetic powder passes out of the lower compartment through the dispenser slot into the upper compartment and is deposited onto the textured surface of the sifting dispenser.

Figure 1:
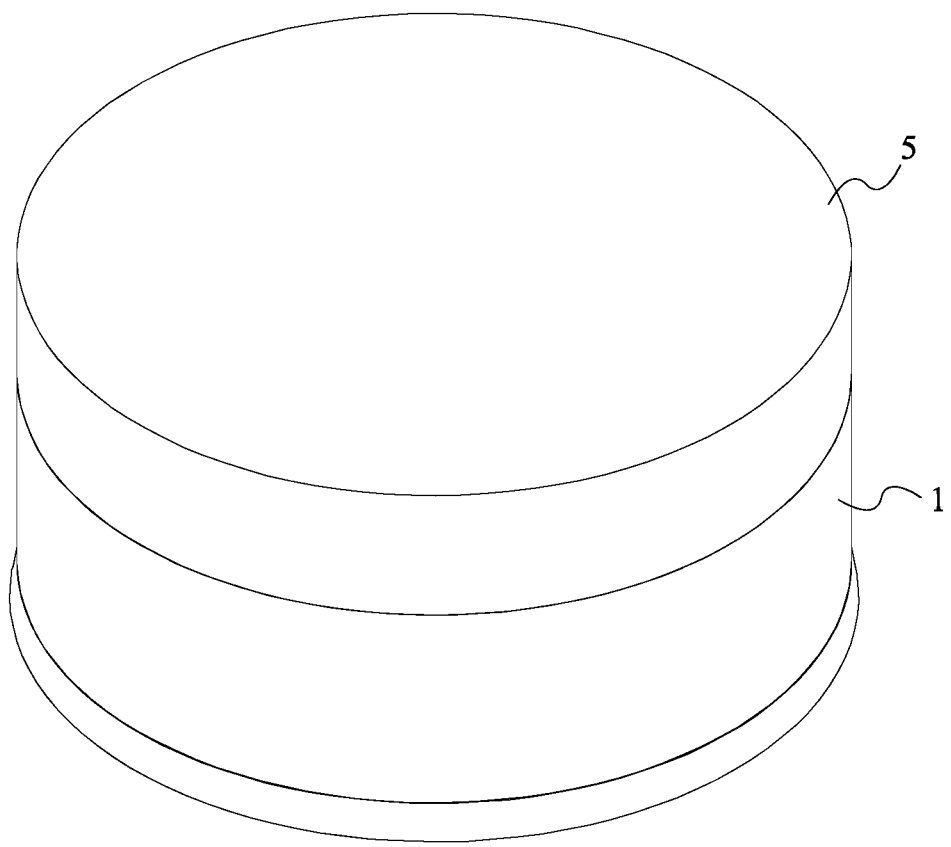
FIG. 1 is an isometric perspective view of the present invention.
Figure 2:
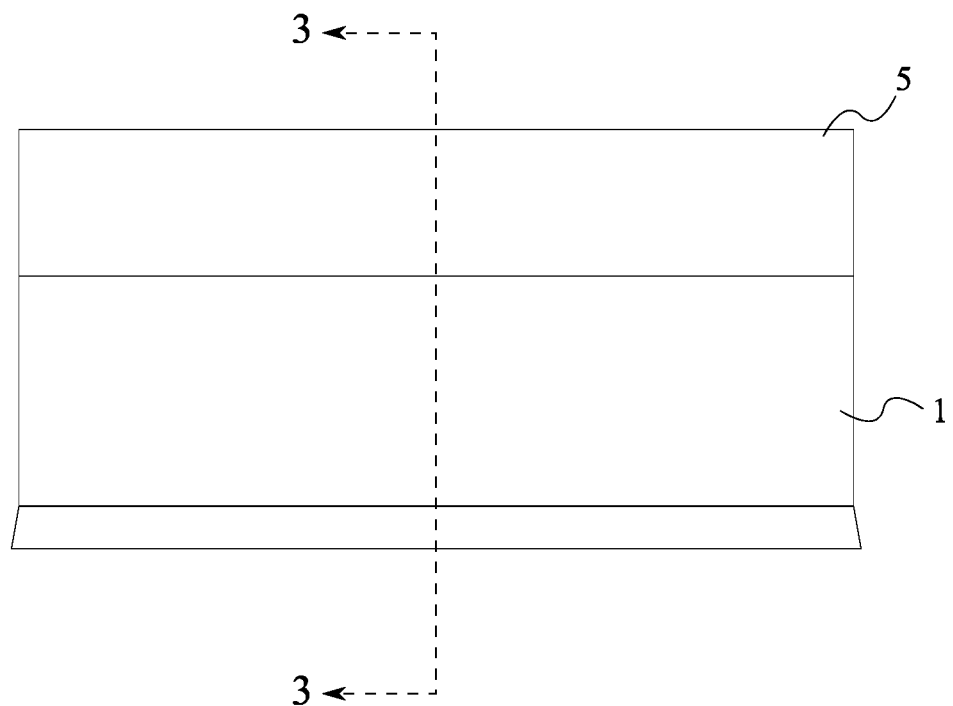
FIG. 2 is a front view of the present invention.
Figure 3:
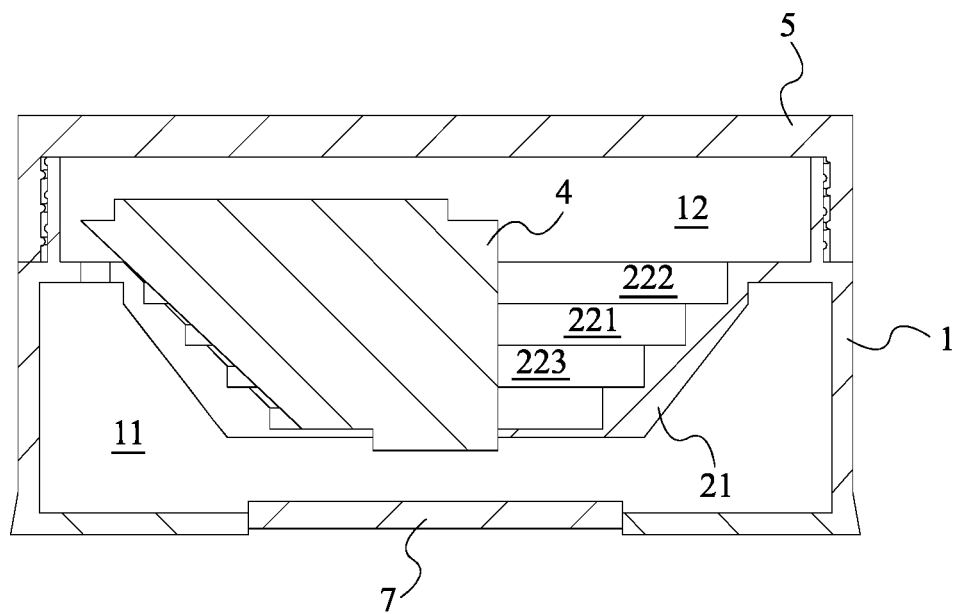
FIG. 3 is a left-side sectional view of the present invention taken along line 3-3 in FIG. 2.
Figure 4:
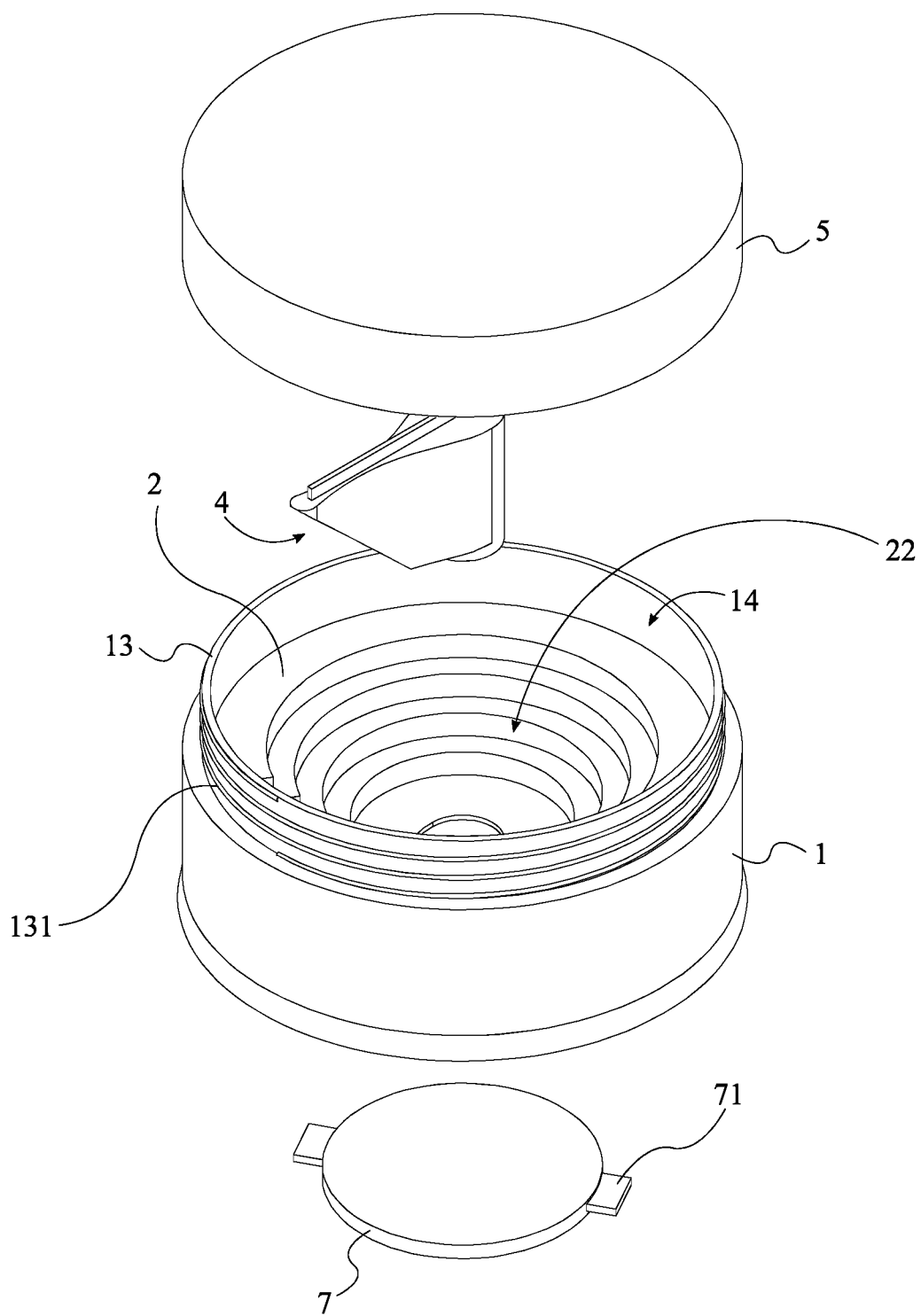
FIG. 4 is an exploded perspective view of the present invention.
Figure 5:
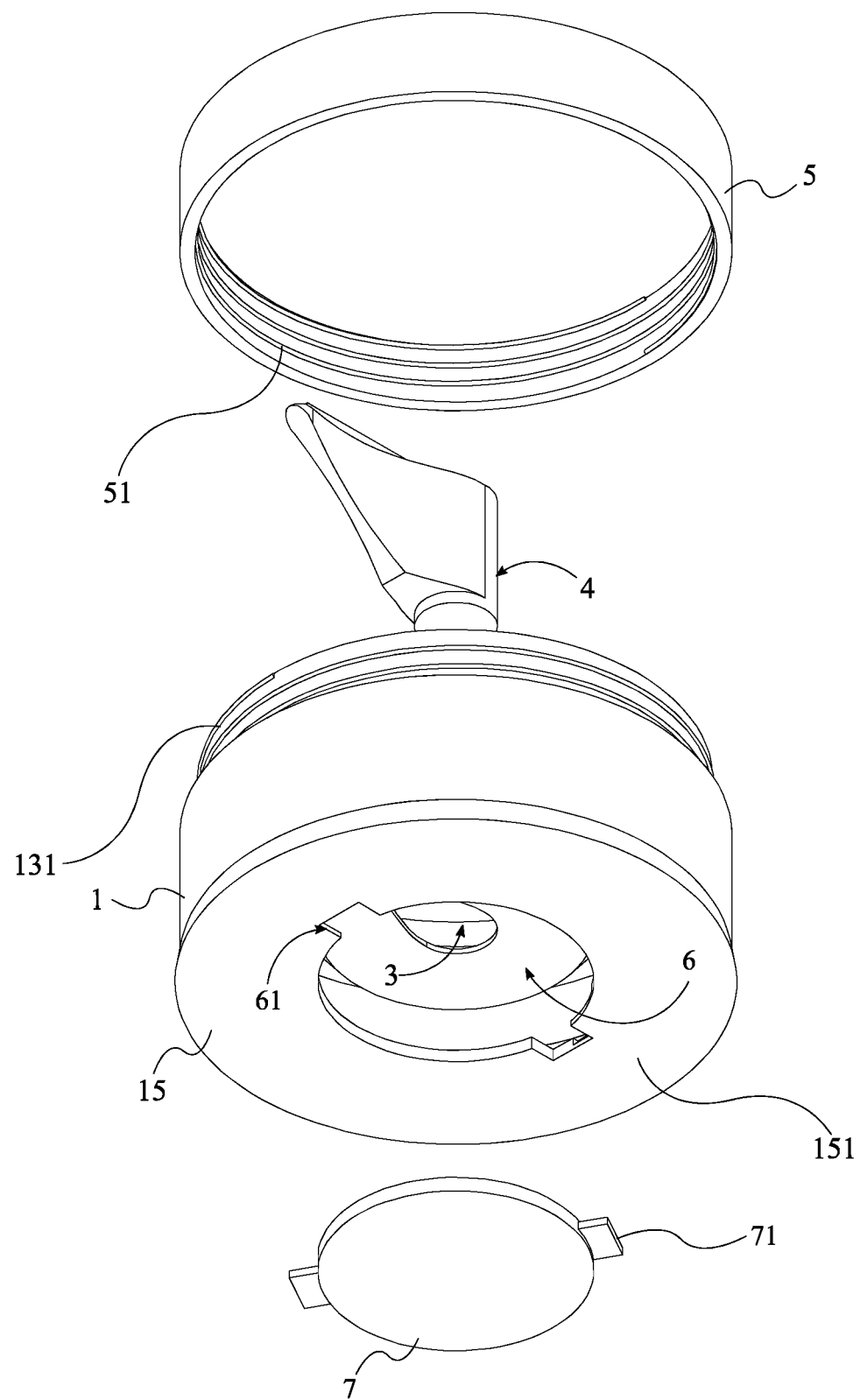
FIG. 5 is an exploded perspective view of the present invention.
Figure 6:
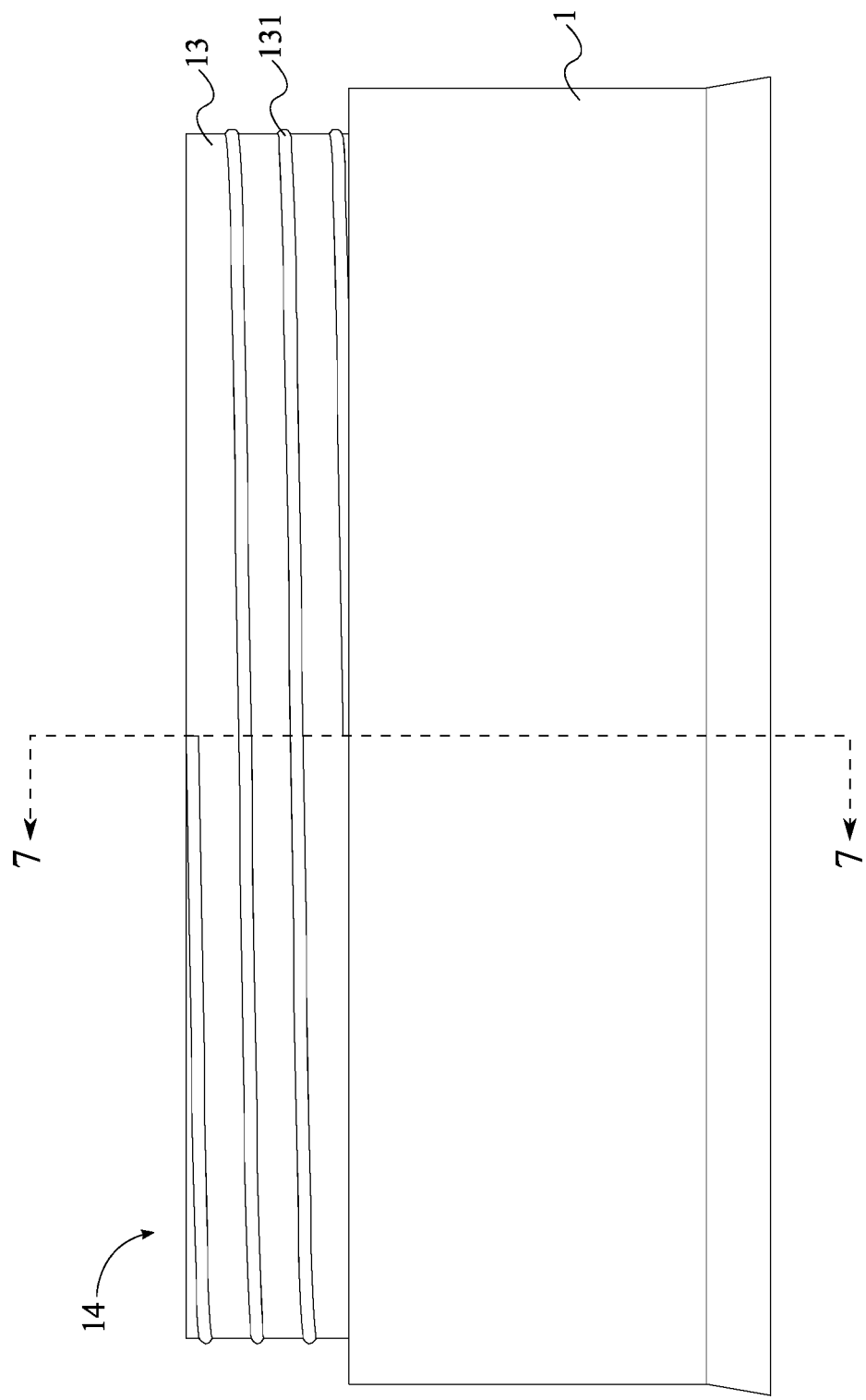
FIG. 6 is a front view of the jar used in the present invention.

As can be seen in FIG. 3, FIG. 4, and FIG. 5, to achieve the above described functionalities, the present invention comprises a jar 1, a multitiered sifting-dispenser 2, a dispenser slot 3 and a closure plug 4. Additionally, the jar 1 comprises a first compartment 11 and a second compartment 12. The multitiered sifting-dispenser 2 is a rigid frustum-shaped divider that functions as a sifter for transferring powder to the user's brush and for removing the excess cosmetic powder. To accomplish this, the multitiered sifting-dispenser 2 is mounted within an interior cavity of the jar 1. Additionally, the multitiered sifting-dispenser 2 is positioned in between the first compartment 11 and the second compartment 12. As a result, the multitiered sifting-dispenser 2 forms a barrier between the first compartment 11 and the second compartment 12. Furthermore, the first compartment 11 is positioned in between a base of the jar 1 and the multitiered sifting-dispenser 2. Accordingly, the first compartment 11 functions as a storage space for the cosmetic powder. The dispenser slot 3 traverses from the first compartment 11, through the multitiered sifting-dispenser 2, and into the second compartment 12. Consequently, the dispenser slot 3 functions as a conduit through which the cosmetic powder is transferred between the first compartment 11 and the second compartment 12. Finally, the closure plug 4 is a rigid, or semi-rigid, device that functions as a plug for the dispenser slot 3. As such, the closure plug 4 engages into the dispenser slot 3. Accordingly, the closure plug 4 is able to prevent cosmetic powder from passing through the dispenser slot 3.

As can be seen in FIG. 3 and FIG. 4, to transfer a portion of the cosmetic powder out of the first compartment 11 and into the second compartment 12, the user removes a jar lid and the closure plug 4, reapplies the jar lid and upends the jar 1 so that a quantity of the cosmetic power is able to pass through the dispenser slot 3. The cosmetic powder that passes through the dispenser slot 3 is deposited into the second compartment 12. When the user places the jar 1 in an upright orientation, the cosmetic powder within the second compartment 12 is moved to rest on the textured surface of the multitiered sifting-dispenser 2. The user then employs a brush to transfer the cosmetic powder from the textured surface to the brush. As this transfer is occurring, excess loose powder is being pushed back through the dispenser slot 3 into the first compartment 11. The excess cosmetic powder is thus deposited back into the first compartment 11. Accordingly, the user is able to remove any unwanted cosmetic powder from the multitiered sifting-dispenser 2. Thus, the present invention facilitates the application of cosmetic powders.

As can be seen in FIG. 4 and FIG. 5, the present invention is designed to not only dispense cosmetic powders, but to act as a storage container for cosmetic powders as well. To accomplish this, the present invention comprises a lid 5. Additionally, the jar 1 comprises an upper-connection rim 13. The upper-connection rim 13 is a ridge that circumscribes an upper opening 14 of the jar 1 and acts as an attachment mechanism that enables the lid 5 to be mounted onto the jar 1. Further, the upper-connection rim 13 delineates the upper opening 14 of the jar 1 so that the lid 5 may be mounted over the upper opening 14 of the jar 1. Finally, the lid 5 is mounted around the upper-connection rim 13. As a result, the lid 5 is used to seal the upper opening 14 of the jar 1 while mounted around the upper-connection rim 13. Expounding on the descriptions of the attachment between the lid 5 and the jar 1, the lid 5 and the jar 1 are preferably joined using a threaded connection. Specifically, the present invention comprises an upper-connection threading 131 and a first jar-connection threading 51. The upper-connection threading 131 is laterally connected around the upper-connection rim 13. Additionally, the first jar-connection threading 51 is laterally connected within the lid 5. Accordingly, the upper-connection threading 131 is able to mate to the first jar-connection threading 51. Thereby attaching the lid 5 to the jar 1. Specifically, the upper-connection threading 131 engages into the first jar-connection threading 51 so that the lid 5 can be attached to the jar 1 to seal the upper opening 14.

As can be seen in FIG. 3 and FIG. 5, the present invention is designed to enable the easy and efficient filling of the jar 1. This is facilitated because the present invention comprises a plug hole 6 and a base plug 7. The plug hole 6 is an opening in the base of the jar 1 that enables the user to fill the first compartment 11 with the cosmetic powder. Specifically, the plug hole 6 traverses through the base of the jar 1 and into the first compartment 11. The base plug 7 is a stopper that becomes permanently attached to the jar 1 once inserted into the plug hole 6. Specifically, when the base plug 7 is engaged into the plug hole 6, the base plug becomes connected to the base of the jar 1 so that the powdered cosmetic cannot fall out of the plug hole 6. To establish the connection between the base plug 7, and the base of the jar 1, the present invention comprises a lower-connection fastener 61 and a plug fastener 71. The lower-connection fastener 61 is an interlocking connection mechanism that interlocks with the plug fastener 71. To accomplish this, the lower-connection fastener 61 is laterally connected within the plug hole 6. Additionally, the plug fastener 71 is laterally connected around the base plug 7. Finally, the plug fastener 71 is engaged into the lower-connection fastener 61. As a result, the base plug 7 can be permanently attached to the base of the jar 1 by connecting the plug fastener 71 to the lower-connection fastener 61. The connection between the base plug 7 and the plug hole 6 can be established using fastening mechanisms that include, but are not limited to, snaps, clasps, and interlocking fasteners.

As can be seen in FIG. 3 and FIG. 4, the multitiered sifting-dispenser 2 is designed to be a textured surface that enables the user to gather a desired amount of the cosmetic powder onto a cosmetic applicator. Specifically, the user is able to drag the cosmetic applicator along the textured surface of the multitiered sifting-dispenser 2 to collect cosmetic powder onto, or remove cosmetic powder from, the cosmetic applicator. To accomplish this, the multitiered sifting-dispenser 2 comprises a frustum-shaped dispenser body 21 and a plurality of steps for retaining dispensed powder 22. The frustum-shaped dispenser body 21 is a rigid member that is positioned within the interior cavity of the jar 1 and serves as the divider between the first compartment 11 and the second compartment 12 Additionally, a diameter of the frustum-shaped dispenser body 21 decreases when moving from the upper-connection rim 13 toward the lower-connection rim 15. That is, the frustum-shaped dispenser body 21 forms an upended frustum where the smallest diameter end is oriented toward the base of the jar 1. Further, the frustum-shaped dispenser body 21 forms the structural foundation of the multitiered sifting-dispenser 2. The plurality of nested receptacles 22 traverses into the frustum-shaped dispenser body 21. As a result, the plurality of nested receptacles 22 forms a stepwise frustum-shaped receptacle within the frustum-shaped dispenser body 21. Relatedly, the frustum-shaped receptacle is directed toward the base of the jar 1 such that each of the plurality of nested receptacles 22 forms a step of the stepwise frustum-shaped receptacle. Additionally, the dispenser slot 3 and the plurality of nested receptacles 22 are concentrically aligned with the frustum-shaped dispenser body 21. Consequently, the dispenser slot 3, the plurality of nested receptacles 22, and the frustum-shaped dispenser body 21 facilitate dispensing and applying the cosmetic powder stored within the second compartment 12.

Figure 7:
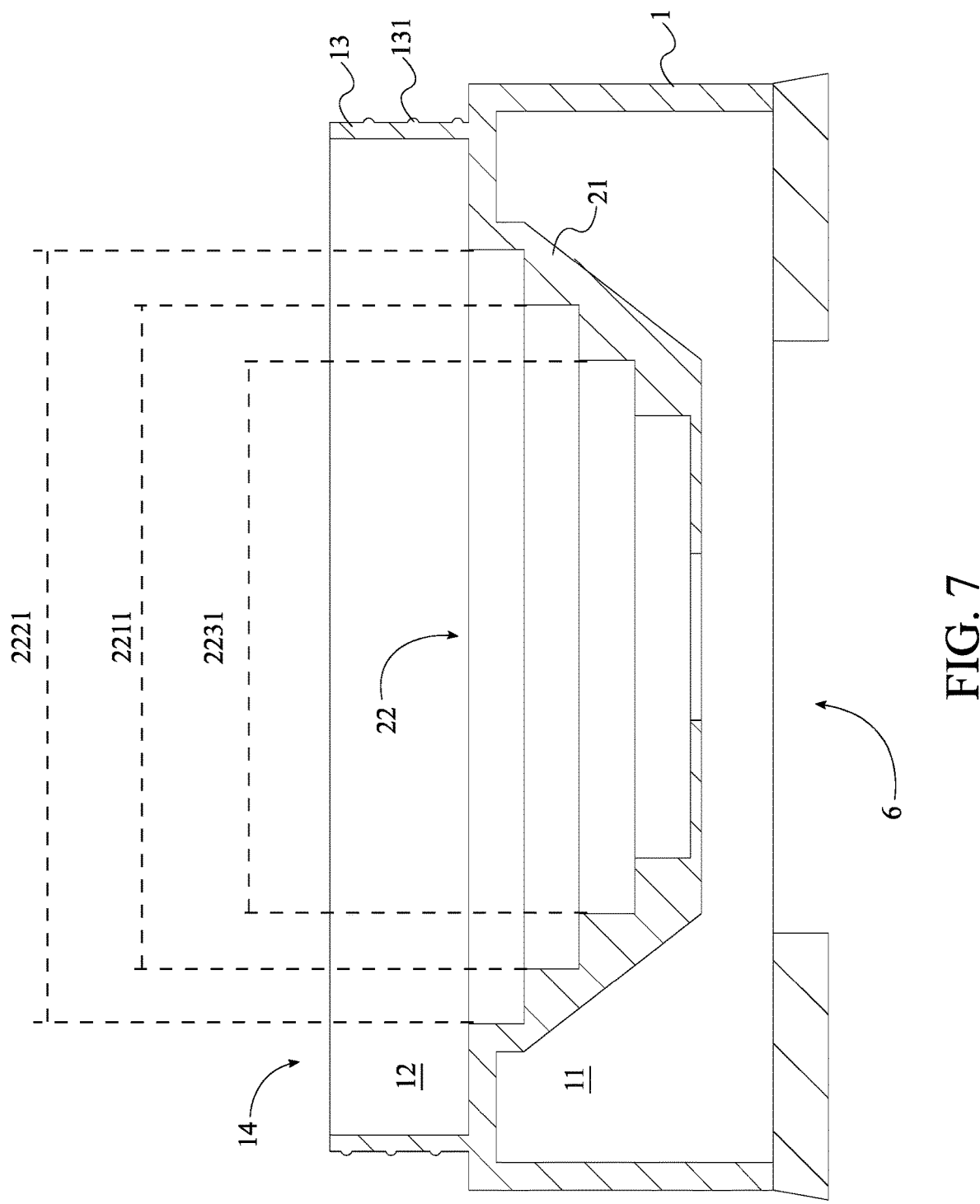
FIG. 7 is a left-side sectional view of the present invention taken along line 7-7 in FIG. 6.

As can be seen in FIG. 3 and FIG. 7, expounding on the descriptions of the plurality of nested receptacles 22, each receptacle from the plurality of nested receptacles 22 is part of a sequential arrangement where the diameter of each receptacle is smaller than the diameter of every preceding receptacle in the sequence. To achieve this, the plurality of steps for retaining dispensed powder 22 comprises a arbitrary first annular-shaped step 221, a second annular-shaped step 222, and a third annular-shaped step 223. As such, a diameter 2211 of the first annular-shaped step 221 is smaller than a diameter 2221 of the second annular-shaped step 222. Additionally, the first annular-shaped step 221 is offset stepwise from the second annular-shaped step 222. Accordingly, the second annular-shaped step 222 forms a tier of the multitiered sifting dispenser that has a larger diameter than the first step and is positioned farther away from the base of the jar 1 than the first step. Likewise, a diameter 2211 of the first annular-shaped step 221 is larger than a diameter 2231 of the third annular-shaped step 223.

Furthermore, the third annular-shaped step 223 is offset stepwise from the first annular-shaped step 221. As a result, the third annular-shaped step 223 forms a tier of the multitiered sifting dispenser that has a smaller diameter than the first step and is positioned closer to the base of the jar 1 than the first step. Heretofore, the first annular-shaped step 221 is positioned in between the second annular-shaped step 222 and the third annular-shaped step 223. However, the descriptions relating to the first annular-shaped step 221, the annular-shaped step 222, and the third annular-shaped step 223 can be applied to any sequential series of steps in the plurality of steps for retaining a dispensed powder 22.

Although the invention has been explained in relation to its preferred embodiment, it is to be understood that many other possible modifications and variations can be made without departing from the spirit and scope of the invention as hereinafter claimed.

What is claimed is:

1. A container for storing and dispensing loose powder comprising:
   a jar comprising a base and a circumferential wall having a proximal end joined to the base and a distal end, the distal end comprising an upper connection rim defining an upper opening of the jar, an exterior surface of the upper connection rim being threaded, the base and the circumferential wall defining an interior cavity therebetween;
   a multitiered sifting-dispenser mounted within the interior cavity of the jar and having a bottom surface and a top surface, the bottom surface having a frustum shape and being spaced apart from the base of the jar to define a first compartment of the interior cavity therebetween, the top surface having a plurality of steps for retaining dispensed powder and a second compartment of the interior cavity being defined between the top surface and the upper connection rim;
   a dispenser slot traversing from the first compartment, through the multitiered sifting dispenser and into the second compartment;
   a closure plug removably engaged into the dispenser slot and extending through an entirety thereof, the closure plug comprising a bottom plug portion removably engaged into the dispenser slot and a lateral oblique plug portion being removably contacted against each of the plurality of steps;
   the base further comprising a base hole traversing through the base and into the first compartment, the base hole having a central circular portion and two grooves protruding radially outwardly from the central circular portion, the two grooves being diametrically opposite one another;
   a base plug comprising a circular portion and two protrusions extending radially outwardly from the circular portion, the two protrusions being diametrically opposite one another such that each of the two protrusions engage one of the two grooves of the base hole and the circular portion of the base plug engages the circular portion of the base hole;
   a lid comprising a top wall and a circumferential side wall protruding from the top wall, an interior surface of the circumferential side wall being threaded, such that the lid threadedly engages the upper connection rim;
   wherein the plurality of steps are concentrically arranged about the dispenser slot.

2. The container for storing and dispensing loose powder as claimed in claim 1 wherein the plurality of steps comprises a first annular-shaped step and a second annular-shaped step; a diameter of the first annular-shaped step being smaller than a diameter of the second annular-shaped step; and the first annular-shaped step being offset stepwise from the second annular-shaped step.

3. The container for storing and dispensing loose powder as claimed in claim 2 wherein the plurality of steps further comprises a third annular-shaped step; a diameter of the first annular-shaped step being larger than a diameter of the third annular-shaped step; and the third annular-shaped step is offset stepwise from the first annular-shaped step.

* * * * *